United States Patent [19]
Day et al.

[11] 3,889,639

[45] June 17, 1975

[54] REARING TANK FOR AQUATIC ANIMALS

[75] Inventors: John J. Day; Paul S. Hirschman, both of Fort Lauderdale, Fla.

[73] Assignee: Ocean Protein Corporation, Dania, Fla.

[22] Filed: Feb. 22, 1973

[21] Appl. No.: 334,622

[52] U.S. Cl. .................................................. 119/2
[51] Int. Cl. ............................................... A01k 61/00
[58] Field of Search ................. 119/2, 3, 4; 210/169

[56] References Cited
UNITED STATES PATENTS

| | | |
|---|---|---|
| 2,944,513 | 7/1960 | Keely .................................. 119/2 X |
| 3,641,982 | 2/1972 | Woodridge et al. .................... 119/4 |
| 3,727,579 | 4/1973 | Lee ...................................... 119/2 |
| 3,738,491 | 6/1973 | Dockery ............................. 210/169 |

*Primary Examiner*—Hugh R. Chamblee
*Attorney, Agent, or Firm*—Darby & Darby

[57] ABSTRACT

A tank for raising of aquatic animals, such as crustaceans, including a plurality of habitats which are stacked vertically, one on top of the other, and a filtration system for the same.

11 Claims, 7 Drawing Figures

REARING TANK FOR AQUATIC ANIMALS

In prior U.S. Pat. No. 3,658,034 and currently pending application Ser. No. 96,137 of John J. Day and Paul S. Hirshcman, both of which are assigned to the assignee of the subject application, various systems are disclosed for rearing of aquatic animals such as crustaceans. These systems are for use in a so-called intensive culture application wherein the aquatic animals are to be raised in an artificial environment under controlled conditions to increase the survival rate of the animals. In the various arrangements described in the aforesaid patent and patent application, the underlying concept was to attempt to more or less distribute a population of animals throughout a given area. To accomplish this, habitats were provided for animals on an individual basis or on a basis where several animals would occupy the same habitat or given habitat area. The underlying theory behind this was that a newly molted animal, one that was most susceptible to cannibalism, would always have a place to hide. Also, by providing an excess of habitats over the number of animals in the tank, a larger percentage of the newly molted animals would survive.

It has also been observed that under intensive culture situations in artificial environments, such as tanks, that crustaceans have a tendency to move in such a manner that their density would increase in the corners of the tank and leave large open areas in the middle when cover is provided around the sides of the tank. This effect is considerably more pronounced in a tank having a relatively small percentage of cover in relation to the total number of animals in the tank. Under these conditions, the central areas of the tank are left relatively open and a few individual animals who would presently molt would move into the tank relatively free of the rest of the population. That is, the molting animal relies upon escaping from the denser packing of the animals for protection when molting rather than seeking his own habitat.

In an article entitled "Further Studies On The Culture Of The Prawn, Palaemon Serratus Pennant, With Emphasis On The Post Larval Stages" by J. R. M. Forster, appearing in Great Britain Ministry of Agriculture, Fisheries and Food Fishery Investigations, Series II, Vol. XXVI, Number 6, published in 1970 by Her Majesty's Stationery Office, London, a report is given on test conducted with a habitat structure in which several platforms of solid, plastic material are stacked vertically above one another. A group of the post-larval animals being reared is placed on each platform which serves as a habitat for the respective group. The tests showed that such a structure could be used to rear animals.

The habitat structure disclosed in the aforesaid publication was done on a laboratory scale and made no provision for adequate filtration of the tank in which the animals were being reared. (In addition, the use of the solid sheets of plastic material prevented light from being used to provide an area where the animals would feel they were relatively more exposed and one to which they would be more likely to travel from the denser packing at the sides of the tank to molt.)

The present invention is directed to an apparatus for the intensive culture of aquatic animals, such as crustaceans, in which a large number of animals can be reared in an arrangement which provides considerable protection for the individual animals who are molting, in accordance with the effect described above. In accordance with the invention, a tank for rearing the animals is provided with a habitat structure formed by a number of growing platforms, in the form of nets, which are vertically stacked, one above the other. The stacking of the platforms permits a large number of animals to be reared in the same tank. In practice, a number of animals are associated with each platform and, as explained above, tend to congregate near the covered sides of a respective platform having the center relatively open. When it is time to molt, an animal leaves the dense stacking of the population at the sides of the platform and proceeds toward its center.

The vertical stacking of the platforms permits a large number of animals to be raised in a single tank. Each platform individually achieves the advantages described above with respect to the spatial protection of a particular animal molting from the other animals of his group on the platform.

The use of the stacked arrangement of the platforms, preferably when these are formed of a material such as a net, or mesh, permits the use of a relatively simple way to filter the water in the tank to remove waste material. Also in accordance with the present invention, a novel filtration system is utilized which incorporates an "air lift" pumping system in which the water for the tank can be circulated at a relatively high rate through the stacked platforms and efficient filtration obtained. The use of the net type material as the platform for the habitat structure also permits light to be present on the lowest platform.

It is therefore an object of the present invention to provide a novel arrangement for raising aquatic animals such as crustaceans at a high stocking density in a tank.

A further object is to provide an arrangement for raising aquatic animals in which a plurality of platforms of foraminous material for respective groups of crustaceans are vertically stacked in the tank.

An additional object is to provide an intensive culture tank for aquatic animals such as crustaceans incorporating a number of platforms of foraminous material, stacked vertically one above another to permit a spatial distribution of the crustaceans on each platform and a spatial separation between crustaceans who are ready to molt from the remainder of the crustaceans in a given group.

Another object is to provide a novel filtration system for a rearing tank for crustaceans.

Still a further object is to provide a novel habitat structure which can be easily removed from the tank.

Other objects and advantages of the present invention will become more apparent upon reference to the following specification and annexed drawings, in which.

Figure 1:
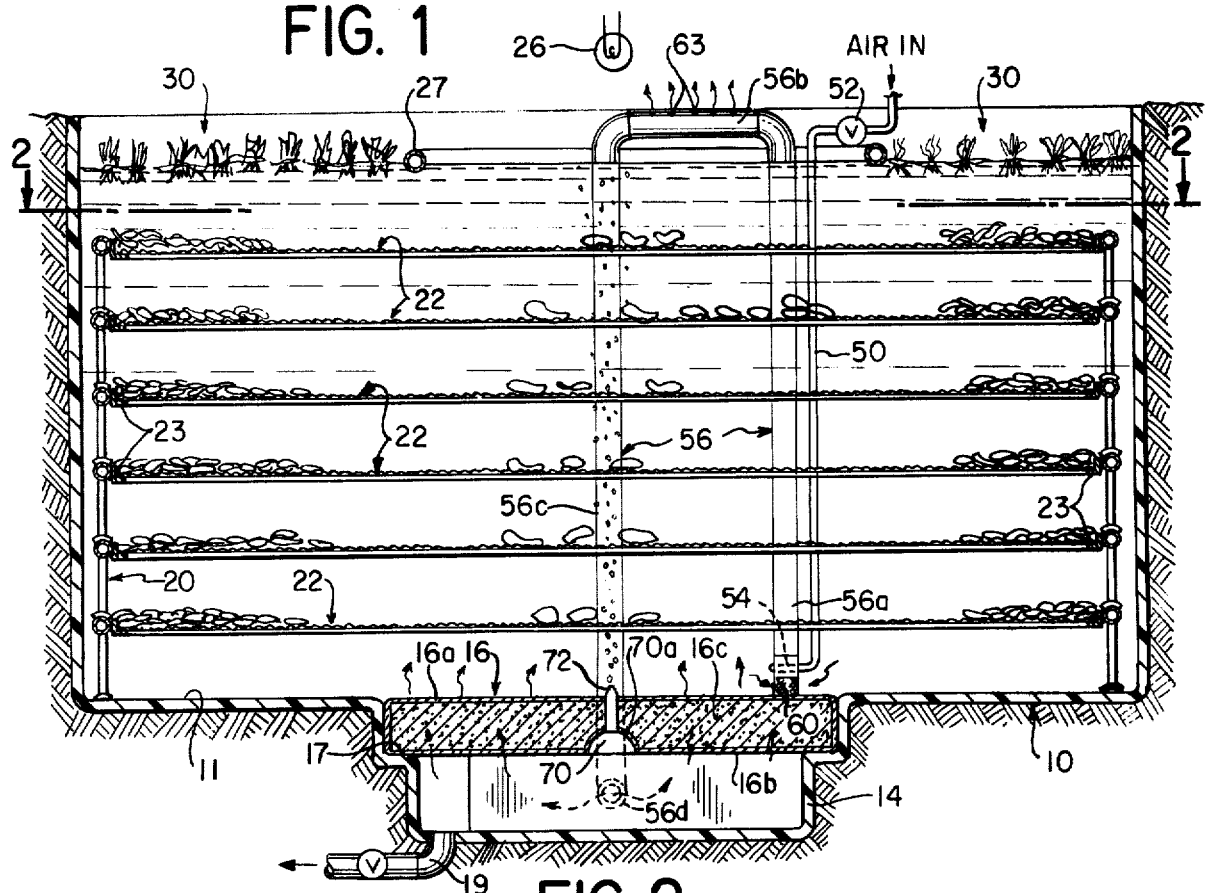
FIG. 1 is an elevational view, taken partly in cross-section, of a tank made in accordance with the invention.
Figure 2:
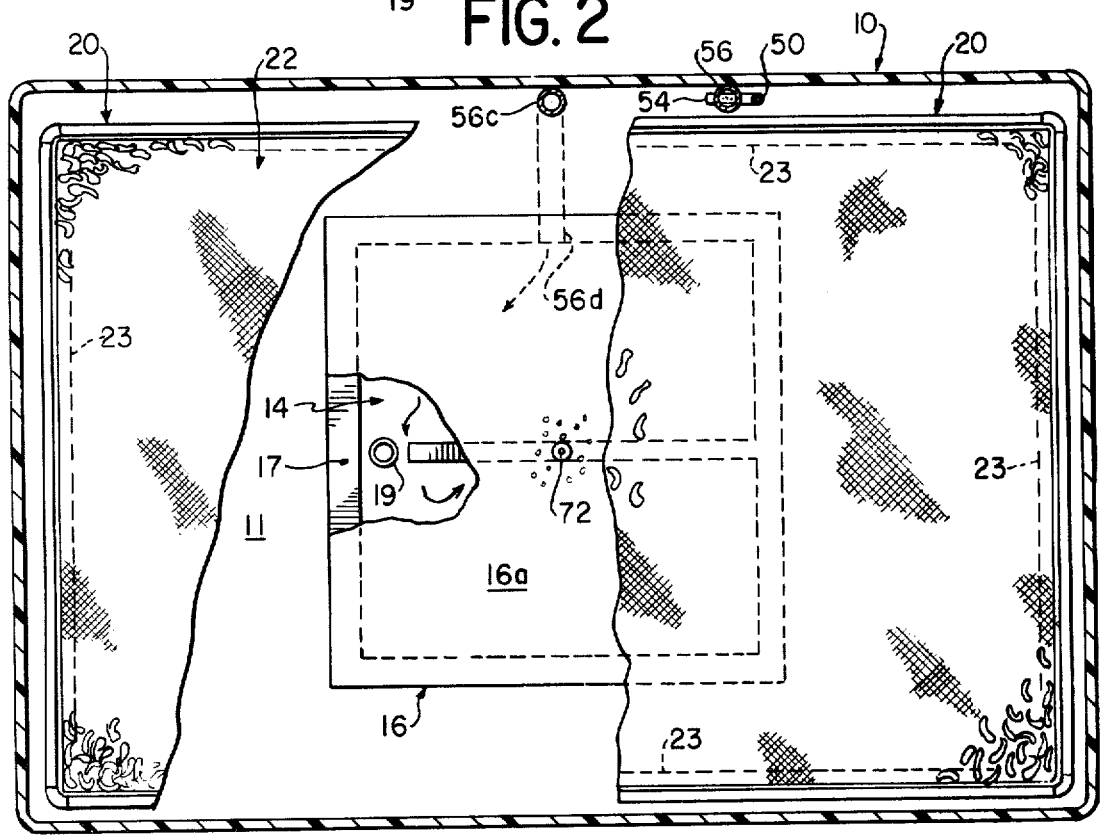
FIG. 2 is a top view of the tank of FIG. 1 taken in cross-section looking along lines 2—2 of FIG. 1.

Referring to the drawings, and particularly to FIGS. 1 and 2, the rearing tank 10 of the present invention is of any suitable shape, such as rectangular square or round, and is made of any suitable material, such as fiberglass, metal, etc. Tank 10 also can be one of a number of tanks of the same or varying sizes adjacent each other in a larger production area. A drain basin 14 extends below the tank bottom wall. The basin is preferably made so that it can be removed from the tank. A filter 16 rests on a shoulder 17, or a series of brackets, located on the inner wall of drain basin 14. The filter 16 is preferably of a construction so that it can be readily removable, e.g. a cartridge type filter filled with a suitable filter media which can be lifted out as a unit from the tank. As shown, filter 16 has porous top and bottom walls 16a and 16b with the filter media 16c located therein. Any suitable filter media can be used, for example sand, charcoal, etc. The composition of the filter media is determined by the particulate material to be filtered out.

A main support frame 20 is located within the tank. The frame 20 is made of pipe or any other similar material which will not contaminate the water environment, for example, PVC (polyvinyl chloride) pipe. Frame 20 provides support for a number of platform structures 22 disposed vertically, one above the other, in substantially parallel layers. The overall shape of frame 20 is such so that each platform 22 can correspond substantially to the general overall interior shape of the tank, leaving, if desired, a small space between the frame 20 and the side walls of the tank. It is preferred that frame 20 be made as a single structure, having supports which rest upon or are fastened to the bottom wall 11 of the tank. An alternative to this, suitable fasteners or brackets can be provided on the side walls of the tank and the platforms 22 suspended from the brackets. Any other suitable mounting arrangement can be utilized.

Each platform 22 includes an outer peripheral frame 23, which is supported by the main frame 20. The frames 23 are preferably removable so that the platforms 22 are individually removable for cleaning, repair, animal removal, animal stocking, etc. The platform floor is suspended on the frame 23. It is preferred that the material for the platform floor be porous or of a foraminous material. A suitable material is a net or mesh of nylon or other similar product which is non-toxic. This permits water circulation and also enables the animals to move, either by crawling or swimming, to various parts of the respective platform. The mesh size is larger than the size of the animals so that the animals can move from platform to platform, if they desire. Each platform has no dividers or partitions so that the animals can move without obstruction to any part of the respective platform on which they are located. This provides maximum separation between the animals at the side of the platform and those at the center.

Each platform 22 defines a home for a number of the animals, e.g. crustaceans being matured. The crustaceans can migrate vertically, that is, they can travel from one platform 22 to another platform 22 either above or below through the nets or around the sides of the frame. Most of the movement takes place adjacent the sides of the tank under the cover provided.

A light source 26 is disposed over the center of the tank. Source 26 can produce light of any suitable desired wavelength and/or color.

A cover is provided adjacent the side walls of the tank and over the side areas of the platforms so that the majority of the light from source 26 will pass only through the central areas of the stocked platforms 22. The light will reach the lowermost platform 22 since the central areas of all the platforms are relatively unoccupied. The cover, designated by number 30, is shown floating on top of the water in the tank and can be of any suitable natural or artificial material. Water hyacinth can be used as can artificial materials such as plastic plants, screen, or plastic filaments. Water hyacinth has the added benefit of removing some of the animal waste products. A floating pipe ring 27 or other suitable device is provided in the center of the tank to prevent the water hyacinth, or other cover material, from floating into the central area of the platforms.

As shown in FIG. 2, the animals on each platform 22 will tend to congregate near the edges of that platform adjacent the wall of the tank under the cover. That is, the animals on a given platform will move forward the frame 23 which defines the periphery of the particular platform. This is true for each of the platforms in the tank so that the central area of each platform in the tank will be essentially open and devoid of animals, or have relatively few animals thereon which are molting. The density of the animals congregating at the sides of each of the platforms 22 will be quite high.

The animals on each platform have a large peripheral area under the cover within which to congregate. When an animal is ready to molt, he will tend to move as far away as possible from the pack congregated at the outer edges of the respective platform for protection. He will move to minimize the danger of being cannibalized by the remaining animals of the group. To do this, he moves toward the open central area of the respective platform. The presence of the light in the central areas of each of the platforms appears to give the animals there an exposed feeling. That is it appears to make the animals feel that they are more alone. When an animal moves to the central area and molts he is relatively safer from the remaining animals of the group than if he had stayed at the edge of the platform. Once the particular animal finishes molting, he moves back into the group at the edges of the respective platform.

Since the tank 10 is stocked with a large number of animals, there is a large amount of waste that must be removed. The relatively open central areas of the platforms 22 permit the use of a filtering system which can accomplish this.

Figure 3:
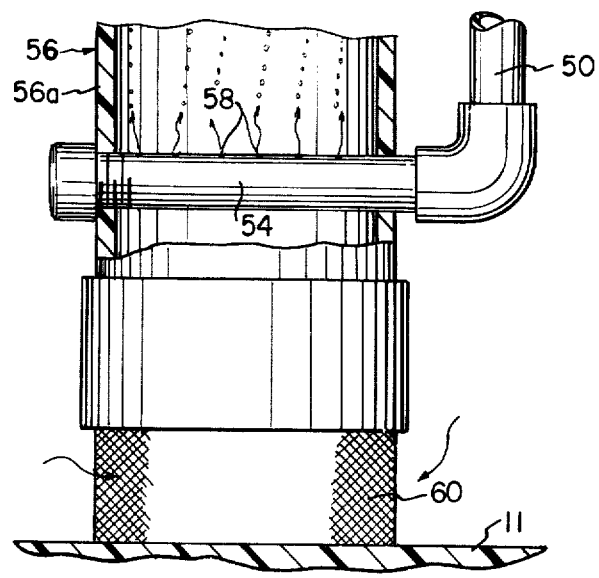
FIG. 3 is an elevational view, showing a fragmentary portion of the filter system.

The filter system is shown in FIGS. 1-3. Here, air from a blower or other air source (not shown) is supplied to a pipe 50 through a valve 52 and then to a diffuser 54 located within an air and water supply pipe 56. As shown in FIG. 3, the diffuser 54 is, for example, a short section of pipe having a number of holes 58 therein. The bottom end of the lift section 56a of supply pipe 56 is left open to serve as a water intake and it is covered by a screen 60 to prevent any animals from entering.

Pipe 56 has a lift section 56a which extends vertically the height of the water level in the tank and has an upper horizontal section 56b located above the water level. The horizontal section 56b has a number of holes 63 therein which communicate with the atmosphere. The pipe 56 has a vertical return section 56c with an outlet end 56d which extends through the bottom wall 11 of the tank into the drain basin 14 below filter 16.

Air from air supply pipe 50 reaches the diffuser 54 where it exits through the holes 58 in small jets into the lift pipe section 56a. As the air leaves pipe 50, it mixes with the water inside of the lift pipe 56a and the air-water mixture rises. Additional water is sucked into the lift pipe 56a through the screen 60.

The velocity of the air-water mixture in the lift pipe 56a carries it above the water level in the tank and into the pipe upper section 56b. The majority of the air in the mixture escapes through the vents 63 in the pipe section 56b as it flows by. The water, still containing a small amount of entrained air, then flows down the return pipe section 56c and it is discharged through the outlet end 56d in the basin 14 under the filter 16. The water in the drain basin 14 is forced upwardly through the filter 16 back into the main portion of the tank. Heavy particles of material travelling with the water settle out into the filter basin. Smaller particles are trapped in the filter media and held there until the filter is back-washed.

The small amount of entrained air in the water coming out of the end 56d of return pipe 56c is collected in an air trap 70 and allowed to bubble through the water back to the surface. The air trap 70 includes a generally hemispherical member 70a formed in the bottom plate 16b of the filter. A small jet nozzle 72 attached to member 70a extends above the top surface 16a of the filter into the tank.

The trapped air bubbles back to the surface of the water in tank 10. This serves several purposes. First of all, if the air is permitted to build up in a pocket under filter 16, this in time would isolate the filter from the water. Secondly, the bubbles leaving the nozzle 72 create a water current, bringing the filtered water from the bottom of the tank to the top of the tank, resulting in a more even distribution of the filtered water. Third, the bubbled air provides a secondary point of aeration, preventing any stratification of non-oxygenated water in the tank.

Back-washing of the filter 16 is accomplished by shutting off the air in the pipe 50 and opening a drain 19 in the bottom of the filter basin. The weight of the water in the tank forces the water through the filter bed in a direction opposite to the direction of flow during the filtration cycle. Small particles of material captured in the filter medium are washed from the filter and passed out of the tank through the drain. Larger particles are scoured from the filter basin which is preferably removed when the tank is to be completely cleaned. It has been found that by draining approximately only about 10 percent of the total water volume in the tank through filter 16 that a satisfactory back-washing and cleaning of the filter can be accomplished. Thus, the filter can be cleaned without disturbing the animals in the tank to any great extent. After the filter is cleaned, the drain is shut, additional water added to the tank and the air supply is turned back on.

Figure 4:
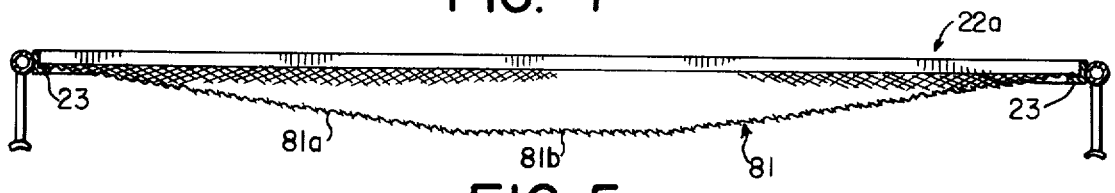
FIGS. 4 and 5 are cross-sectional views showing additional embodiments of platforms for the animals.

FIG. 4 shows another embodiment for platforms 22. Here, instead of having the floor of each platform substantially flat, through its entirety, as shown in FIGS. 1 and 2, the frame 23 is made, or floats are used (not shown), so that the central portion 81b of the platform 22 is substantially flat and the portions 81a between the central portion and the sides of each platform slope upwardly. The slope can be linear or curved.

The arrangement shown in FIG. 4 has several advantages in that it provides a greater area on the sloping side walls 81a of each platform for the animals to congregate during the periods when they are not molting. In addition, when an animal does molt and he moves into the generally flat central area 81b, he is separated by a somewhat further distance than if the entire platform 22 was flat. Here again, the platform material is made from netting or any other suitable material.

Figure 5:
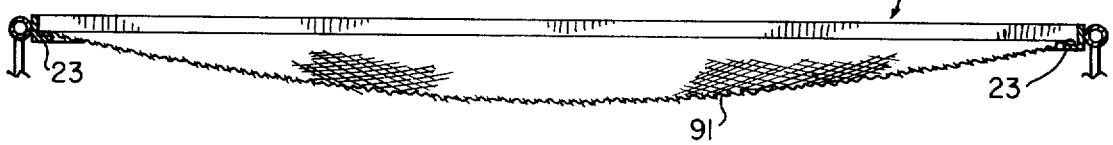

While the embodiment shown in FIG. 4 includes a flat central area 81b it should be understood that the entire platform floor can have a substantially curved surface, such as shown, for example, in FIG. 5. In both the embodiments of FIGS. 4 and 5, the advantages of the high density stocking of animals are still achieved.

Figure 7:
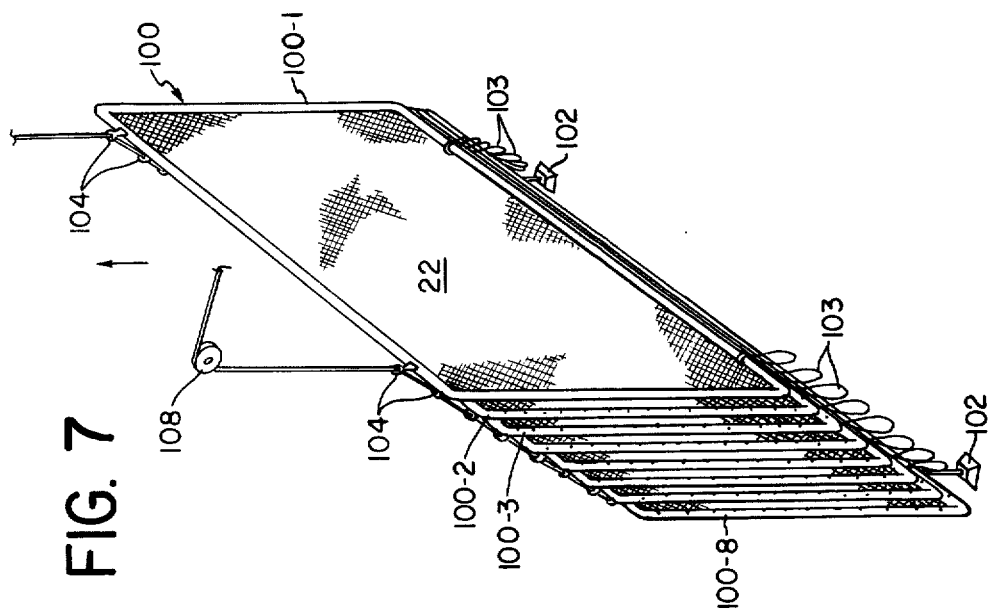
FIGS. 6 and 7 are perspective views of a platform assembly shown in the use and collapsed positions respectively.
Figure 6:
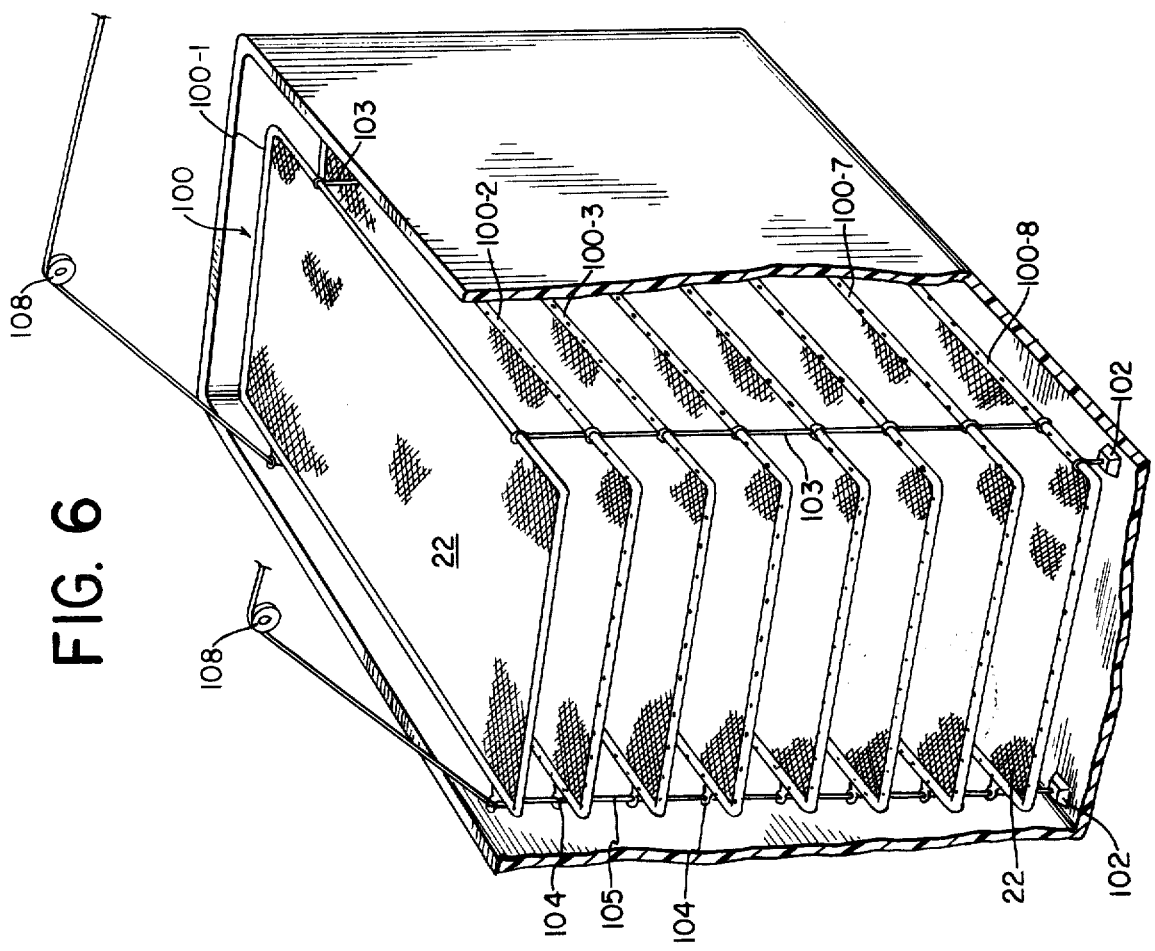

FIGS. 6 and 7 show a further embodiment of a habitat structure which can be readily removed from the growing tank and from which the animals also can be removed very quickly. The structure includes a number of frames 100 of a suitable shape, shown generally rectangular, which are vertically stacked one above the other. A net, forming the platform 22, is suspended from each frame. As in the case of FIGS. 1, 4, and 5, the net can be flat or of a curved configuration.

The frames 100 are made of a light buoyant material such as PVC pipe. The top frame 100-1 is left fully closed so that it will float. The lower pipe frames, illustratively shown as 100-2 through 100-8, have holes drilled in them so that they will sink. Both sides of the frames are shown tied together by a set of ropes 103 with the space between each tie being the spacing to be maintained between the frames. A number of weights 102 are attached to the bottom frame 100-8 to hold it down. The top frame 100-1 has sufficient buoyancy to support the other frames but not the weights 102 on the bottom frame. Therefore, the entire habitat structure will be immersed in the water of the tank with the spacing between platforms determined by the lines 103.

Each frame 100 has a pair of padeyes 104 spaced along side through which is run a respective line 105. The ends of the pair of lines 105 are tied to the bottom frame 100-8 and run through each succeeding padeye toward the top of the structure and then through a respective pulley 108 which is suspended above the surface of the tank. By pulling on the set of lines 105 the frames 100 of the habitats come to a vertical position and begin to collapse together. The animals on the respective nets slide out into the water at one end of the structure as the habitats continue to be raised. Finally, the complete habitat assembly is pulled clear of the water surface, leaving behind in the tank the animals which can then be handled very easily.

In each of the embodiments of the invention described heretofore only one set of platforms is shown within a given tank. It should be understood, of course, that a number of sets, or stacks, of platforms can be utilized in a tank. This arrangement provides the arrangement of being able to rear different groups of animals, for example, animals of different ages in the same tank. Where the folding arrangement of the platforms, such as shown in FIGS. 6 and 7, is utilized, a particular group of animals can be removed from the tank at one time leaving the other animals undisturbed.

What is claimed is:

1. Apparatus for maturing movable aquatic animals comprising a liquid containing tank with a top open to the environment for holding fluid, a plurality of platforms of foraminous material located within said tank across which the animals can move unobstructed, means for stacking said platforms spaced vertically one above the other, and means located below the lowermost platform of the stack of platforms for circulating the liquid through the tank while filtering the same, the filtered liquid passing upwardly through said platforms.

2. Apparatus as in claim 1 wherein said platforms are substantially flat.

3. Apparatus as in claim 1 wherein said platforms slope upwardly from the center.

4. Apparatus as in claim 1 wherein said foraminous material for each of said platforms comprises a net.

5. Apparatus as in claim 1 wherein said circulating means has an outlet generally in the central area of the stack of platforms.

6. Apparatus as in claim 1 wherein said circulating and filtering means comprises an air lift filter system including a filter media at the bottom of the liquid of the tank, a conduit having a first portion with an inlet adjacent the bottom of the tank, and a second portion having an outlet beneath said filter medium, means for supplying gas under pressure to said first portion of said conduit to convey liquid from the inlet to the outlet of the conduit, the liquid discharged from the outlet passing upwardly through the filter media back into the tank.

7. Apparatus as in claim 6 further comprising means for permitting the escape of trapped gas from below the filter media into the fluid of the tank.

8. Apparatus as in claim 6 further comprising means for bleeding the gas from the conduit.

9. Apparatus as in claim 8 wherein said means for bleeding the gas comprises a third portion of said conduit located above the liquid level of the tank and having gas discharge means thereon.

10. Apparatus as in claim 1 further comprising means attached to said plurality of platforms for collapsing the stack of platforms together.

11. Apparatus as in claim 10 wherein each said platform comprises a frame on which the foraminous material is located and said collapsing means comprises a first line attached to the bottom frame and passing through a fixed point of all of the other frames, and a second line fixedly attached to each of the other frames.

* * * * *